US009974409B2

(12) United States Patent
Cabilli et al.

(10) Patent No.: US 9,974,409 B2
(45) Date of Patent: May 22, 2018

(54) SYSTEM FOR THE PREPARATION OF BEVERAGES

(71) Applicants: LUIGI LAVAZZA S.P.A., Turin (IT); POLITECNICO DI TORINO, Turin (IT)

(72) Inventors: Alberto Cabilli, Moncalieri (IT); Danilo Bolognese, Turin (IT); Denis Rotta, Turin (IT); Luca Bugnano, Moncalieri (IT); Elvio Bonisoli, Turin (IT)

(73) Assignee: LUIGI LAVAZZA S.p.A., Turin (IT)

( * ) Notice: Subject to any disclaimer, the term of this patent is extended or adjusted under 35 U.S.C. 154(b) by 187 days.

(21) Appl. No.: 15/037,842

(22) PCT Filed: Dec. 17, 2014

(86) PCT No.: PCT/IB2014/067024
§ 371 (c)(1),
(2) Date: May 19, 2016

(87) PCT Pub. No.: WO2015/092712
PCT Pub. Date: Jun. 25, 2015

(65) Prior Publication Data
US 2016/0287003 A1    Oct. 6, 2016

(30) Foreign Application Priority Data
Dec. 18, 2013 (IT) .............................. TO2013A1039

(51) Int. Cl.
*A47J 31/36* (2006.01)
*A47J 31/06* (2006.01)
(Continued)

(52) U.S. Cl.
CPC ....... *A47J 31/0647* (2013.01); *A47J 31/0668* (2013.01); *A47J 31/0673* (2013.01);
(Continued)

(58) Field of Classification Search
CPC . A47J 31/3633; A47J 31/3628; A47J 31/3623
(Continued)

(56) References Cited

U.S. PATENT DOCUMENTS 7,798,055 B2 *  9/2010  Mandralis ........... A47J 31/0673
                                                   99/284
8,028,616 B2 * 10/2011  Van Der Meer .... A47J 31/0647
                                                   99/284
8,857,317 B2 * 10/2014  Manser .................. A23L 1/296
                                                   99/289 R

FOREIGN PATENT DOCUMENTS

EP          1 208 782 A1      5/2002

OTHER PUBLICATIONS

International Search Report of PCT/IB2014/067024 dated May 13, 2015 [PCT/ISA/210].
(Continued)

Primary Examiner — Reginald L Alexander
(74) Attorney, Agent, or Firm — Sughrue Mion, PLLC

(57) ABSTRACT

A system for the preparation of beverages including capsules (C) with a cup-shaped body (1) having an annular lateral wall (6) which tapers from a mouth opening (2) towards a bottom wall (5). These capsules (C) are of at least a first type and a second type, and have identical bottom walls (5) and different axial lengths (h1, h2, h3). An infusion assembly (10) has a variable-volume infusion chamber (20), having an introduction opening (20a), an end delimitation part (16a) having a shape corresponding to that of the bottom wall (5) of the capsules (C), and with a lateral delimitation structure (13a, 13b; 14) which includes a static portion (13a, 13b) and which extends between said introduction opening (20a) and the end delimitation part (16a). The latter is movable away from the introduction opening (20a).

5 Claims, 7 Drawing Sheets

(51) Int. Cl.
   *A47J 31/40*      (2006.01)
   *B65D 85/804*     (2006.01)
(52) U.S. Cl.
   CPC ....... *A47J 31/3623* (2013.01); *A47J 31/3628* (2013.01); *A47J 31/3633* (2013.01); *A47J 31/3695* (2013.01); *A47J 31/407* (2013.01); *B65D 85/8043* (2013.01)
(58) Field of Classification Search
   USPC ........................................ 99/284, 295, 289 R
   See application file for complete search history.

(56) References Cited

OTHER PUBLICATIONS

Written Opinion of PCT/IB2014/067024 dated May 13, 2015 [PCT/ISA/237].

* cited by examiner

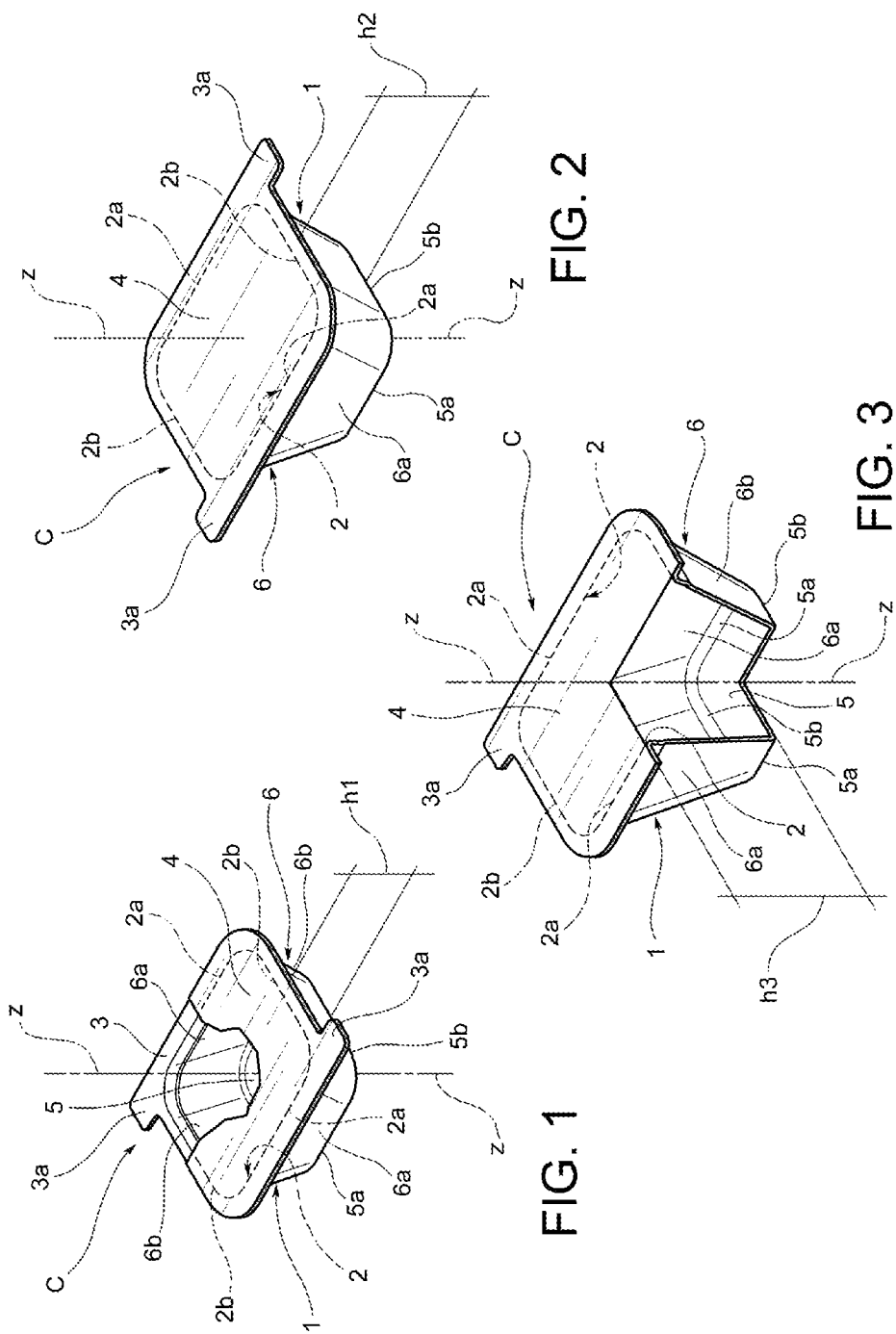

SYSTEM FOR THE PREPARATION OF BEVERAGES

CROSS REFERENCE TO RELATED APPLICATIONS

This application is a National Stage of International Application No. PCT/IB2014/067024, filed Dec. 17, 2014, claiming priority based on Italian Patent Application No. TO2013A001039, filed Dec. 18, 2013, the contents of all of which are incorporated herein by reference in their entirety.

BACKGROUND OF THE INVENTION

Field of the Invention

The present invention relates to a system for the preparation of beverages by infusion, using prepackaged capsules, preferably of the sealed type, containing a quantity of a substance, for example ground roast coffee, for the preparation of a beverage.

Background

More specifically, the invention relates to a system comprising, in a known way,
- capsules having a cup-shaped body with a mouth opening closed by a cover, a bottom wall and an annular side wall which extends between the mouth opening and the bottom wall, tapering towards said bottom wall; said capsules being of at least first and second types, having essentially equally-sized bottom walls and different axial lengths; and
- an infusion assembly wherein there is defined a variable-volume infusion chamber, having an introduction opening, an end delimitation part having a shape and dimensions corresponding to those of the bottom wall of said capsules, and with a lateral delimitation structure which comprises a static portion which extends between said introduction opening and the end delimitation part;
- the end delimitation part being movable inside the lateral delimitation structure away from the introduction opening;
- the arrangement being such that one of said capsules, introduced into the infusion chamber, is capable of causing a movement of the end delimitation part away from the introduction opening, such that the infusion chamber assumes a configuration and dimensions corresponding to those of the type of capsule introduced thereinto.

A system of this type for the preparation of beverages is described and illustrated in European patent application EP 1 208 782 A1.

In this known system, a capsule, selectively of a first or a second type, is made to bear on a loading plate which, by means of a manually operated control lever, is then translated horizontally and subsequently raised vertically, so as to introduce this capsule into the infusion chamber formed in a percolation unit. The arrangement is such that the operation of the control lever simultaneously causes a lowering of the percolation unit. The latter comprises a fixed lateral delimiting structure of the infusion chamber, in which an end delimiting part of said chamber is vertically slidable in a liquid-tight way. Because of the coupling between the loading plate and the percolation unit, the capsule introduced into the infusion chamber causes a movement of the end delimiting part of this chamber, as a function of the axial length of the capsule.

With this known system, it is essentially possible to differentiate between the volumes of the different types of capsules solely by providing them with different lengths or heights, and therefore the larger-volume capsules have a rather pronounced height; in other words they are rather long.

One object of the present invention is to provide an improved system for the preparation of beverages of the type defined initially.

SUMMARY OF THE INVENTION

This and other objects are achieved according to the invention with a system for the preparation of beverages of the aforesaid type, characterized principally in that:
the lateral delimitation structure of the infusion chamber further comprises a movable portion interacting with the aforesaid static portion, said movable portion being movable along a predetermined direction, transversely to the direction of introduction of the capsules into said chamber, away from the fixed part against the action of associated first opposing means, so as to increase the cross-section of the introduction opening and, correspondingly, the volume of the infusion chamber; the end delimitation part of the infusion chamber being coupled to said movable part and being movable against the action of associated second opposing means, so that a movement of the end delimitation part away from the control opening causes a corresponding movement of the movable part away from the fixed part of the lateral delimitation structure.

Because of these characteristics, the system according to the present invention allows the use of different types of capsules, the volumes of which are differentiated not only by their different lengths or heights, but also by their different cross-sections.

BRIEF DESCRIPTION OF THE DRAWINGS

Other characteristics and advantages of the invention will become clear from the following detailed description, provided purely by way of non-limiting example, with reference to the attached drawings, in which:

FIGS. 1 to 3 are perspective views showing three different types of capsules that can be used in a system for the preparation of beverages according to the present invention;

DETAILED DESCRIPTION OF THE INVENTION

Figure 4:
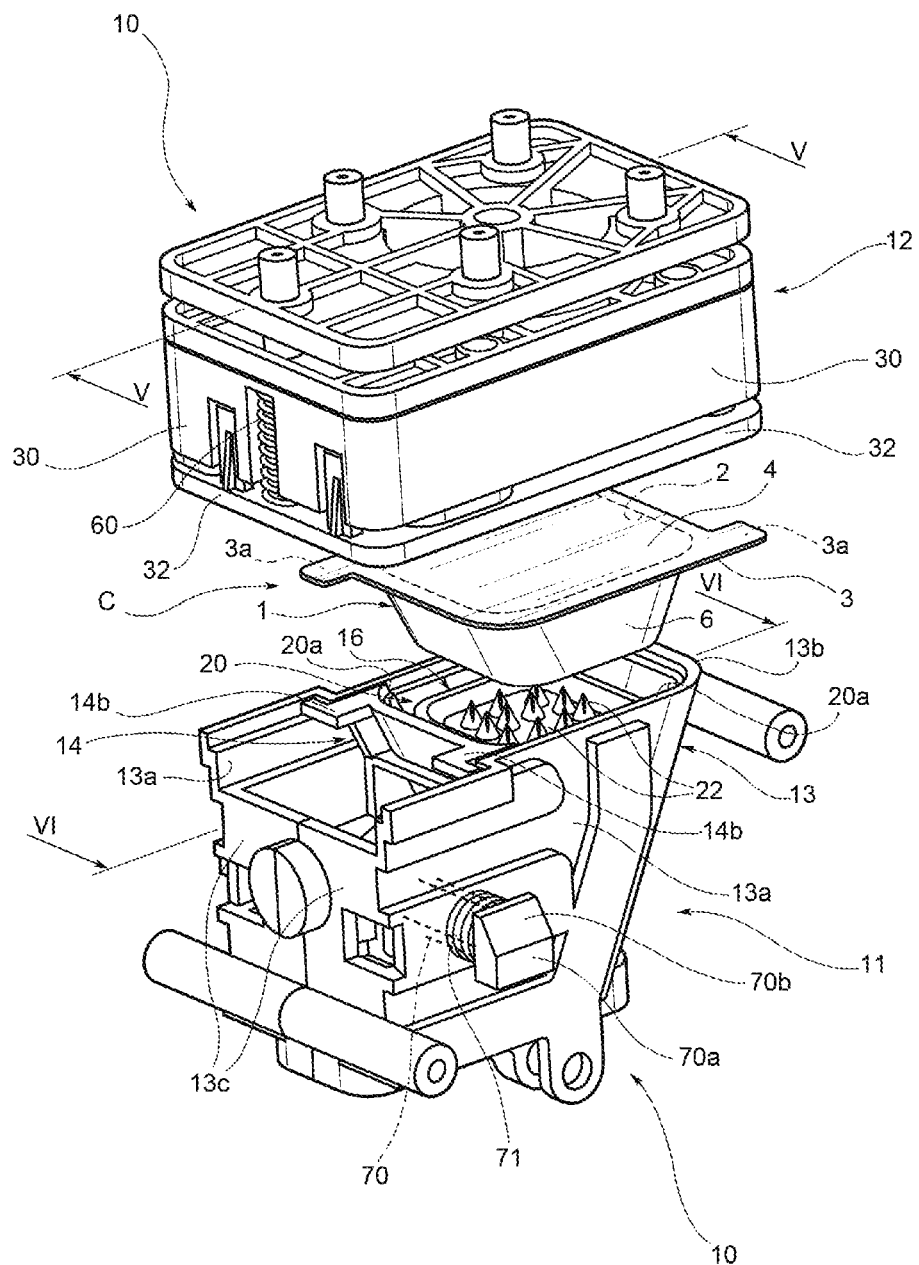
FIG. 4 is a perspective view showing an infusion assembly for use in a system for the preparation of beverages according to the present invention.

The system for the preparation of beverages according to the present invention provides for the use of capsules of a plurality of types, having different respective axial lengths.

A group of three different types of capsule that can be used in a system according to the invention is shown in FIGS. 1 to 3.

FIG. 1 shows a capsule C comprising a cup-shaped body 1, with a mouth opening 2 which in the illustrated embodiment essentially has the shape of a rectangle with rounded corners, with two parallel longer sides 2a and two shorter sides 2b which are also parallel.

The body 2 has a transverse top flange 3 which surrounds the mouth opening 2, and which forms two projecting appendages 3a, essentially parallel to each other and extending on opposite sides, near two diagonally opposed vertices of the opening 2. In the illustrated embodiment, the appendages 3a extend parallel to the longer sides 2a of the mouth opening 2 of the capsule body.

The number 4 indicates a cover which closes, and preferably seals, the mouth opening 2.

The body 1 of the capsule C has a bottom wall, indicated by 5 in FIGS. 1 to 3.

In the illustrated embodiment, the bottom wall 5 of the capsule C has a shape similar to that of the mouth opening 2, in other words an essentially rectangular shape with rounded corners, with longer sides 5a and shorter sides 5b. However, the similarity between the shape of the bottom wall and the shape of the mouth opening is not an essential characteristic.

The body 1 of the capsule C further comprises an annular lateral wall 6, extending between the mouth opening 2 and the bottom wall 5. This lateral wall tapers towards the bottom wall 5, in the sense that the cross-section transverse to the vertical axis Z-Z of the capsule decreases (not necessarily in a monotonic manner) from the mouth opening 2 to the bottom wall 5.

In the illustrated exemplary embodiment, the lateral wall 6 essentially takes the shape of a truncated pyramid with rounded lateral edges. However, this shape is not essential.

In the illustrated embodiment, the annular lateral wall 6 comprises two pairs of essentially flat lateral walls 6a and 6b, which are respectively longer and shorter, and which unite the longer sides 2a and shorter sides 2b of the mouth opening 2 with the corresponding longer sides 5a and shorter sides 5b of the bottom wall 5.

In the illustrated embodiment, the longer lateral walls 6a and shorter lateral walls 6b have respective predetermined inclinations relative to the axis Z-Z. In particular, the shorter walls 6b are inclined symmetrically at the same angle relative to the axis Z-Z.

However, this condition of symmetrical inclination is not essential.

The three types of capsule C shown in FIGS. 1 to 3 have rather similar shape characteristics. In particular, these capsules have bottom walls 5 with the same shape and dimensions, shorter lateral walls 6b which have essentially the same inclination relative to the axis Z-Z in the different types of capsules, and different respective axial lengths or heights (indicated by h1, h2 and h3 respectively, with h1<h2<h3, measured parallel to the axis Z-Z). The mouth openings of these types of capsules have shorter sides 2b which are the same as one another and longer sides 2a which are different from one another, in proportion to the respective heights.

The internal volume of the capsules C shown in FIGS. 1 to 3 is therefore differentiated both by the different heights of the capsules and by their different average cross-sections.

The body 1 of the capsules C described above is preferably made of a material selected so as to prevent or at least impede the penetration of moisture and oxygen into the capsule.

The cover 4 which seals the mouth openings of these capsules may be made, for example, of plastic material, of metal, or of a composite material, and may be formed by moulding, by thermoforming, or by other known techniques. This cover 4 is applied in a sealing way to the flange 3 of the body of said capsules in one of various known ways.

A system according to the invention further comprises a machine for the preparation of beverages, designed to use capsules of at least two of the types described above.

Figure 5:
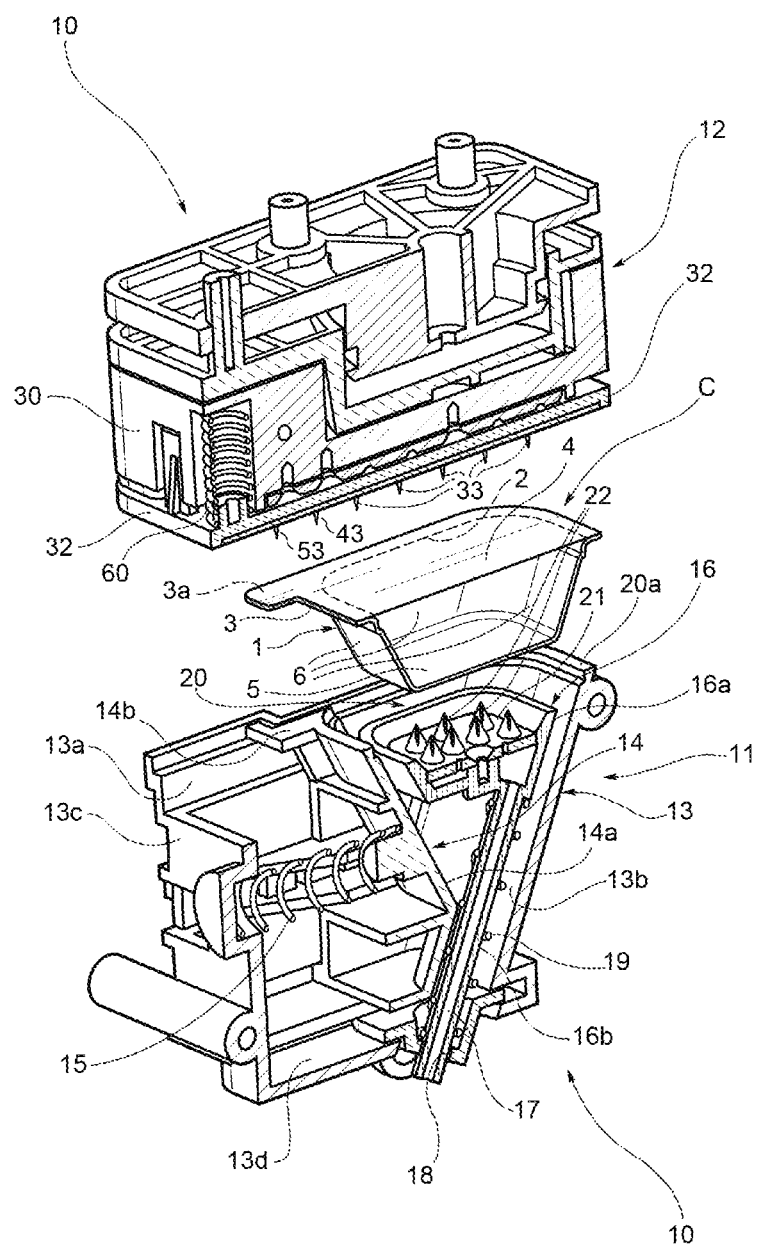
FIG. 5 is a sectional rear perspective view of the infusion assembly according to FIG. 4.

A machine of this type comprises an infusion assembly, indicated as a whole by 10 in FIGS. 4 and 5.

In the illustrated embodiment, the infusion assembly 10 essentially comprises a capsule-holding assembly, indicated as a whole by 11, and an associated piercing and injecting head indicated as a whole by 12.

In the illustrated exemplary embodiment, the capsule-holding assembly 11 comprises a hollow supporting body 13, having two longer lateral walls 13a facing one another, and a pair of shorter end walls, 13b and 13c, also facing one another, together with a bottom wall 13d.

In the illustrated embodiment, the walls 13a and 13c are essentially vertical and orthogonal to one another, and are also orthogonal to the bottom wall 13d.

On the other hand, the lateral wall 13b is inclined relative to the vertical direction at an angle of inclination essentially equal to the angle of inclination of a shorter lateral wall 6b of the capsules C, described above, relative to the axis Z-Z.

The wall 13b is also connected to the longer lateral walls 13a, preferably in a curved manner, as shown in FIGS. 4 and 5 in particular.

A body 14 is mounted in a horizontally translatable manner in the hollow supporting body 13. A spring 15, interposed between the wall 13c and this body 14, tends to push the latter towards the wall 13b.

The body 14 comprises, in particular, an upper wall portion 14a which is inclined relative to the vertical, in an essentially symmetrical way to the wall 13b of the supporting body 13, as can be seen in FIGS. 5 to 9 in particular.

A further body, indicated as a whole by 16, is mounted in a translatable manner in the supporting body 13, between the wall 13b of the latter and the movable body 14.

The body 16 comprises an essentially tray-shaped upper portion 16a, the upper part of which has a shape and dimensions corresponding to those of the bottom wall 5 of the capsules C described above.

A tubular portion 16b extends obliquely downwards from the portion 16a, a conduit 17 being formed within the tubular portion, this conduit being designed to allow the outflow of the finished beverage, as explained more fully below.

The tubular portion 16b of the body 16 extends through an opening 18 formed in the lower part of the supporting body 13.

A helical spring 19 is placed around the tubular portion 16b of the body 16, and tends to push this body 16 upwards.

An infusion chamber, indicated as a whole by 20, is completely formed within the supporting body 13, between its inclined end wall 13b, the wall 14a of the body 14, the lateral walls 13a of the body 13, and the upper portion 16a of the body 16.

This infusion chamber 20 has a top opening 20a (defined by the upper edges of the walls 13a, 13b and 14a) through which, in use, a capsule C is introduced with its bottom wall 5 facing downwards.

The upper portion 16a of the body 16 preferably has its side facing the body 14 inclined in the same way as the wall portion 14a of the latter.

Figure 6:
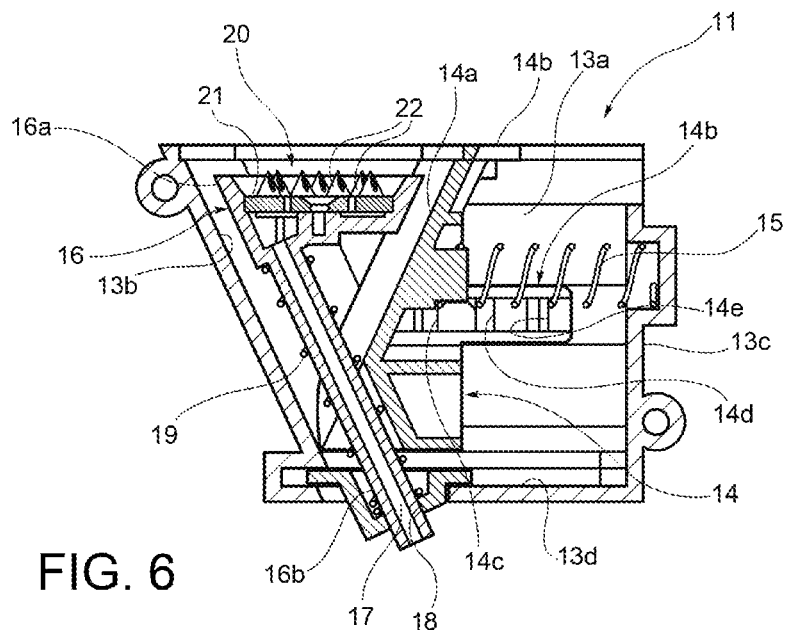
FIG. 6 is a partial sectional view taken along the line VI-VI of FIG. 4.

Under the action of the spring 19, the body 16 is normally kept in the rest position shown in FIG. 6, in which it extends near the introduction opening 20*a* of the infusion chamber 20.

When a capsule C, of the type shown in FIG. 1 for example, is introduced into the infusion chamber 20 and positioned therein, the bottom wall 5 of the capsule bears on the upper end of the body 16, and causes this body 16 to be lowered against the action of the spring 19. In its downward movement, the upper portion 16*a* of the body 16 comes to bear on the inclined wall 14*a* of the body 14, and then as it moves farther downwards it causes this body 14 to be translated, towards the right as seen by a viewer of FIG. 6, until it reaches the condition shown in FIG. 7.

In this condition, the flange 4 of the capsule C is positioned essentially flush with the upper part of the body 13, and the bodies 14 and 16 are held by the associated springs 15 and 19 in the illustrated position.

Figure 7:
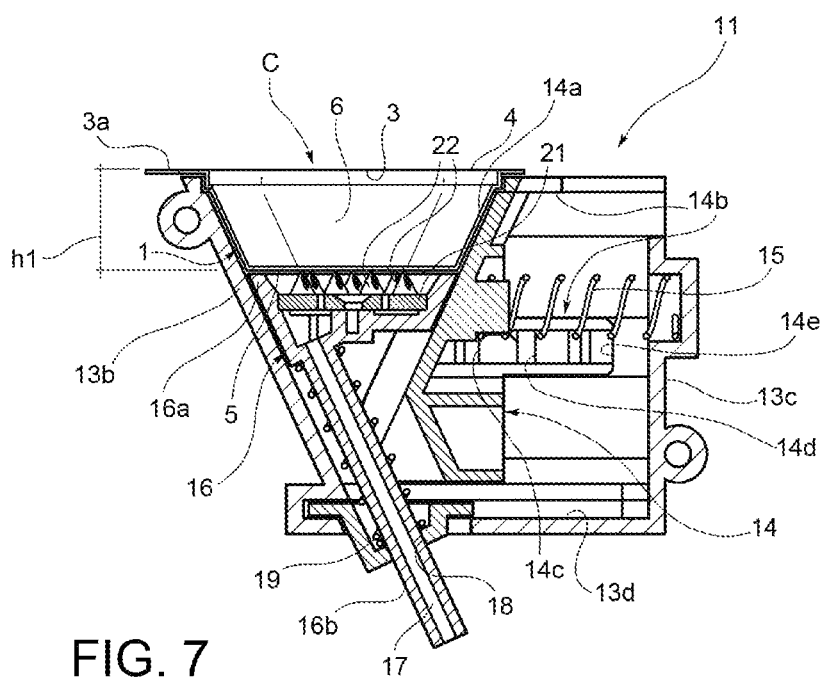
FIGS. 7 to 9 are sectional views similar to that shown in FIG. 6, and show part of the infusion assembly into which capsules of the types shown in FIGS. 1, 2 and 3 respectively have been introduced.
Figure 8:
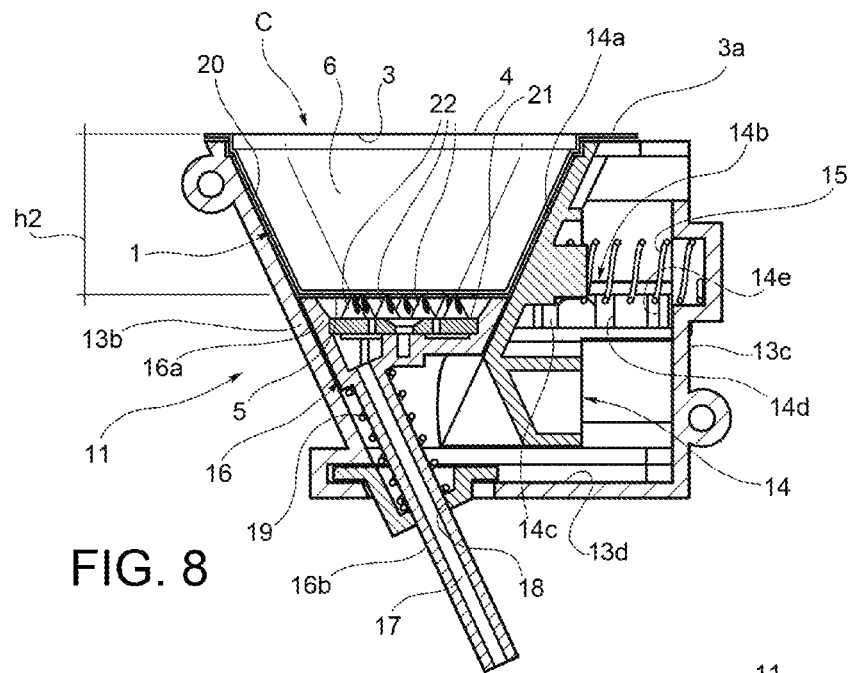

Similarly, if a capsule C, of the type shown in FIG. 2 for example, is introduced into the infusion chamber 20 and positioned therein, on completion of the positioning the capsule-holding assembly 11 is configured as shown in FIG. 8: the upper portion 16*a* of the body 16 extends at a lower level than in the situation shown in FIG. 7, and the body 14 extends farther to the right. Overall, the infusion chamber 20 then has a greater volume, capable of containing a capsule C of the type shown in FIG. 2.

Figure 9:
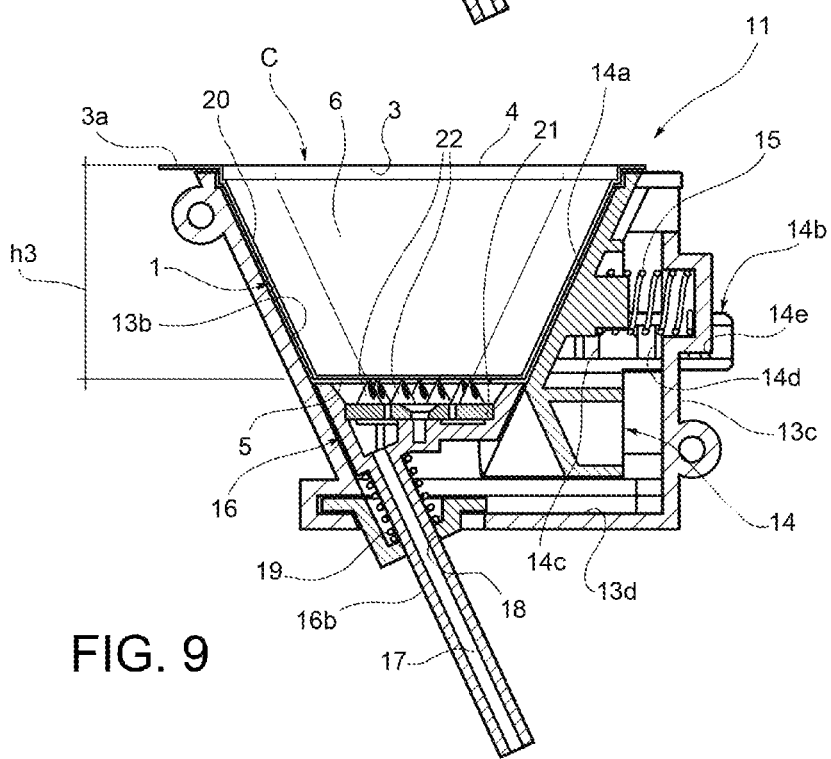

Similarly, FIG. 9 shows the capsule-holding assembly 11 in the condition in which a capsule C of the type described above with reference to FIG. 3 has been introduced into the infusion chamber 20 and positioned therein.

With reference to FIGS. 6 to 9, a formation 14*b* extends horizontally from the body 14, this formation having three openings 14*c*, 14*d* and 14*e*, spaced apart from one another, formed within it.

As can be partly seen in FIG. 4, a catch 70 extends through a longer lateral wall 13*a* of the body 13, an end of this catch extending outside this body and forming a head 70*a* having an inclined plane 70*b*. A spring 71, interposed between said wall 13*a* and the head 70*a*, tends to return the catch 70 towards the outside.

When the head 12 and the capsule-holding assembly 11 are made to engage with one another for the purpose of preparing a beverage, a control member (not shown) acts on the inclined plane 70*b* of the head 70*a*, causing this head to move towards the body 13 against the action of the spring 71.

Depending on the type of capsule introduced into the capsule-holder 11, the end of the catch 70 opposite the head 70*a* will engage in one of the openings 14*c*, 14*d*, 14*e* of the formation 14*b* of the body 14, thus stabilizing the operating position of the latter as well as the operating position of the body 16.

In the upper portion 16*a* of the body 16 there is housed a plate 21, having a plurality of spikes 22 which are capable, as described more fully below, of piercing the bottom wall 5 of a capsule C introduced into the capsule-holding assembly 11 and positioned therein. In a known way, the spikes 22 have passages which allow the beverage, made by infusion inside the capsule, to flow out downwards, below the plate 21, and to enter the conduit 19 provided in the portion 16*b* of the body 16, to be dispensed towards a collecting container such as a cup or a glass.

With reference to FIGS. 4 and 5, in the illustrated embodiment the body 14 has two horizontal appendages 14*b* in its upper part, extending on the side opposite the wall 13*b* of the supporting body 13 relative to the infusion chamber 20. The function of these appendages will be explained below, after the description of the piercing and injecting head 12.

This head 12 comprises a main body 30 in which an opening 31 is made (FIGS. 10 to 12) for the introduction of a flow of hot water and/or steam.

A perforated plate 32 is connected to the bottom of this body 30, in such a way as to be vertically translatable along a short predetermined path.

Figure 11:
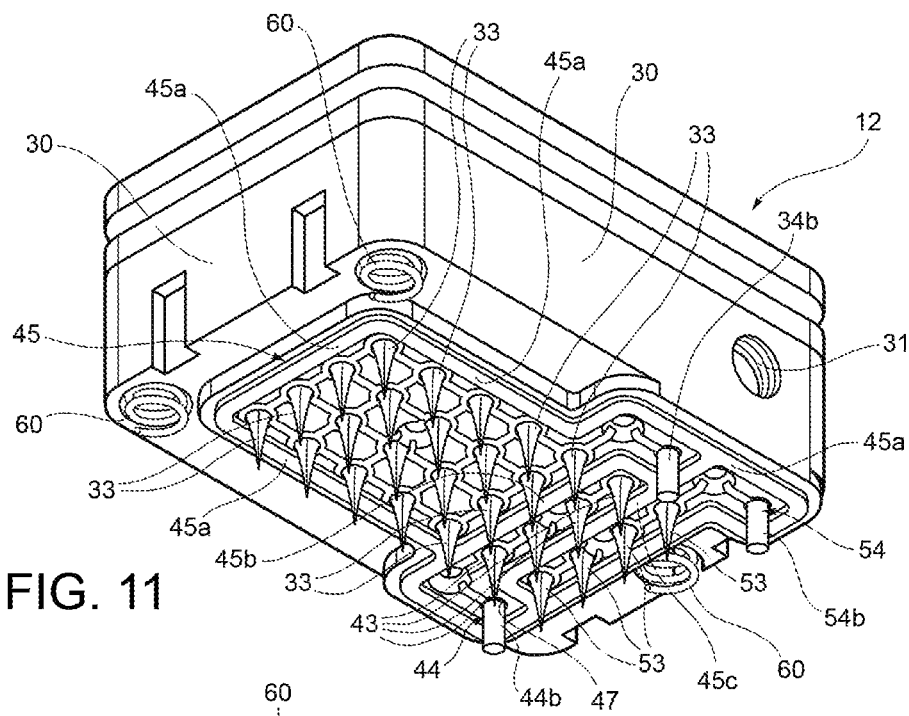
FIGS. 11 and 12 are partial perspective views of the piercing and injecting device of FIG. 10.
Figure 12:
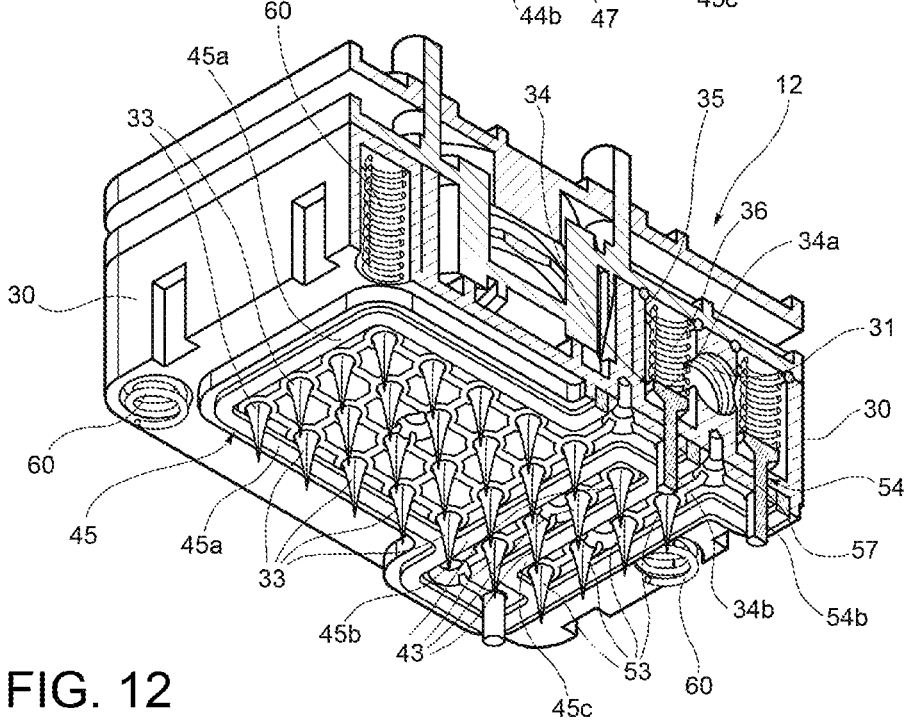

As is more clearly visible in FIGS. 11 and 12, a first plurality of piercing spikes 33 extends downwards from the lower face of the body 30, these spikes being arranged in an array of, for example, four rows of five spikes 33 in line.

This array of spikes 33 occupies a rectangular area whose dimensions are slightly smaller than those of the mouth opening 2 of the capsule C of FIG. 1 (the capsule of smaller height, h1).

A flow of hot water and/or steam under pressure, reaching the head 12 through the opening 31, may be supplied to the spikes 33. The communication between the opening 31 and the spikes 33 is controlled by means of a first shut-off valve which is normally closed, comprising a valve member 34 movable vertically in a seat 35 provided in the body 30 (FIG. 12).

In the illustrated embodiment, the valve member 34 has a head 34*a*, which is acted on by a helical spring 36 positioned above it in the seat 35.

Figure 10:
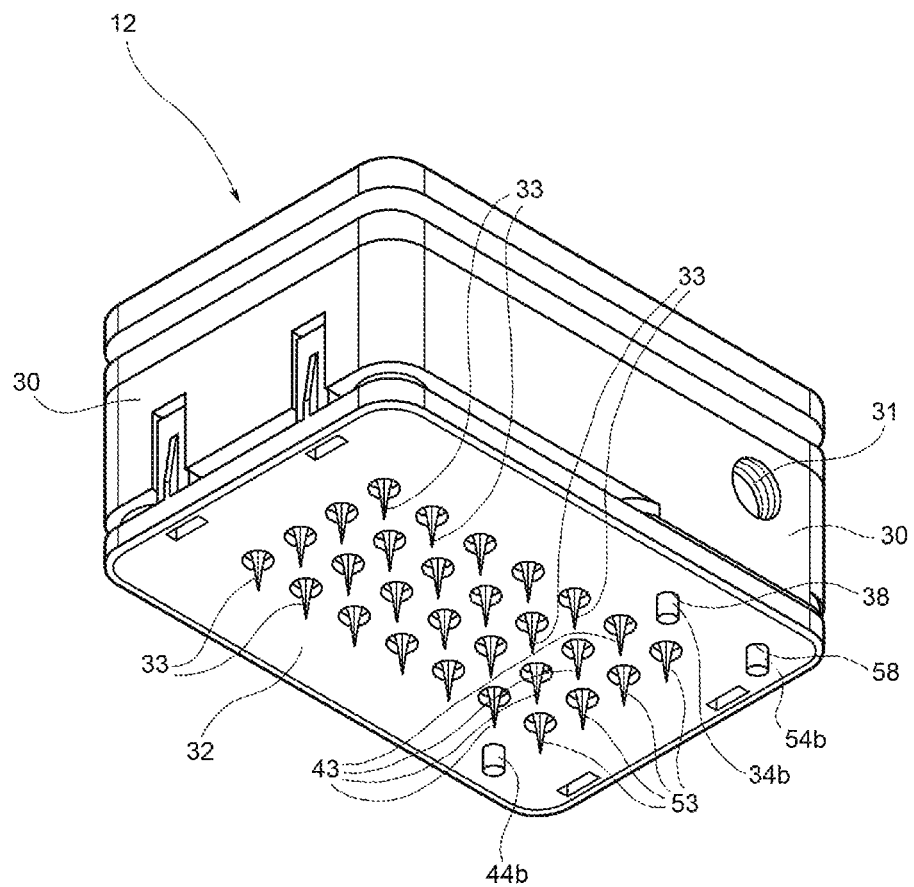
FIG. 10 is a perspective view of a piercing and injecting device included in the infusion assembly according to FIGS. 4 and 5.

Said valve member 34 also has a stem 34*b* extending downwards, through a lower opening 37 in the body 30, and also protruding below the lower plate 32, through an opening 38 in the latter (FIGS. 10 and 12).

With reference to FIGS. 10 to 12, the lower end of the stem 34*b* of the valve member 34 extends in an offset position relative to the spikes 33.

A further group of piercing spikes 43, similar to the spikes 33, extends downwards from the lower face of the body 30. The spikes 43, in the illustrated embodiment, are positioned in line with one another, each being aligned with a corresponding row of spikes 33.

As explained more fully below, the spikes 43, together with the spikes 33, are intended to be used when a capsule C of the type described above with reference to FIG. 2 (capsule of intermediate height, h2) is introduced into the infusion assembly 10 and positioned therein.

The spikes 43 can be put into communication with the supply opening 31, via a second valve device, including a valve member 44 having an operating stem 44*b*, protruding downwards through an opening 47 in the body 30 and through a corresponding opening 48 in the lower plate 32 (FIGS. 10 to 12).

The stem 44*b* of the valve member 44 is also placed in a position offset longitudinally and transversely with respect to the associated piercing spikes 43.

A further group of piercing spikes 53 extends downwards from the lower face of the body 30, these spikes being in line with one another and each being aligned with a corresponding row of spikes 33, 43.

The piercing spikes 53 can also be put into communication with the opening 31 for supplying hot water and/or steam, via an associated valve device including a valve member 54 similar to those described above.

This valve member 54 has an operating stem 54*b* which protrudes downwards through an opening 57 in the body 30 and through a corresponding opening 58 in the lower plate 32 (FIGS. 10 to 12).

The stem 54*b* is also offset longitudinally and transversely with respect to the associated piercing spikes 53.

The lower plate 32 is normally pushed (by springs indicated by 60 in FIGS. 4, 5, 11 and 12) into a rest position in which only the tips of the piercing spikes 33, 43 and 53 project downwards beyond the lower face of this plate 32, through respective openings.

A gasket 45, of moulded elastomeric material for example, surrounds the portions of the lower face of the body 30 from which the spikes 33, 43 and 53 and the stems 34b, 44b and 54b extend. This gasket 45 comprises a peripheral part 45a and two intermediate branches 45b, 45c for decoupling from one another the portions of the body 30 from which the aforesaid spikes 33, 43 and 53 extend.

The gasket 45 is intended to be clamped between the head 12 and the capsule-holder 11 when the infusion assembly is closed for the purpose of preparing a beverage.

When, in use, a capsule C of the type shown in FIG. 1 is introduced into the infusion assembly 10 and positioned therein, one of the projecting appendages 3a of its top flange extends over an appendage 14b of the movable member 14 of the capsule-holder 10 (FIGS. 4 and 7).

The infusion assembly is then closed by means of known mechanisms, in such a way that the head 12 is positioned against the capsule-holding assembly 10.

The arrangement is such that, when the infusion assembly 10 is closed, the lower plate 32 of the piercing and injecting head 12 is pushed towards the body 30 of this head, thereby compressing the opposing springs 60.

The piercing spikes 33 then penetrate through the cover 4 of the capsule, and at the same time the appendage 3a of the capsule, which bears on a corresponding appendage 14b of the body 14, acts on the operating 34 stem 34b of the valve device 34, consequently bringing the opening 31 for supplying hot water and/or steam into communication with the spikes 33.

An amount of hot water and/or steam is then introduced into the capsule.

The pressure consequently created in the capsule causes a downward deformation of its bottom wall 5, which strikes the piercing spikes 22 carried by the member 16 and is torn open.

The water introduced into the capsule interacts with the substance, such as ground roast coffee, contained therein, resulting in the production of the beverage, which is conveyed through the lower piercing spikes 22 and the conduit 19 of the member 16 towards a collecting container.

When a capsule C of the type shown in FIG. 1 is introduced into the infusion assembly 1 and positioned therein, the valve devices 44 and 54 associated with the piercing spikes 43 and 53 are not actuated and remain closed, so that the hot water and/or steam supplied to the opening 31 only reach the piercing spikes 33.

However, when a capsule C of the type shown in FIG. 2 is used, the closing of the infusion assembly 10 causes the cover 4 of this capsule to be pierced by the spikes 33 and the spikes 43.

In this condition, the capsule C enclosed in the infusion assembly acts by means of a portion of its top flange to cause the valve member 34 associated with the spikes 33 to open. Additionally, this capsule, by means of one of its projecting appendages 3a, bearing on a corresponding appendage 14b of the member 14, simultaneously causes the valve device 4 associated with the spikes 43 to open.

On the other hand, the valve device 54 is not actuated, and remains in the closed condition.

A flow of hot water and/or steam can then penetrate into the capsule, through the spikes 33 and 43.

However, when a capsule C of the type described above with reference to FIG. 3 is used, this capsule, by means of two different portions of its flange, causes the valve devices 34 and 44 to open, and, by means of one of its projecting appendages 33a, causes the valve device 54 to open. A flow of hot water and/or steam is then supplied into the capsule, through the spikes 33, 43 and 53 in combination.

The embodiment described above is preferred at the present time.

However, in an alternative embodiment, it is possible to provide a single area of piercing spikes (the spikes 33, for example) having shapes and dimensions such that the spikes can pierce the cover 4 of all the types of capsules shown in FIGS. 1 to 3, with a single associated valve device.

As a further alternative, the piercing and injecting head 12 can be provided, with a single piercing spike instead of a plurality of piercing spikes, the single spike being located in a position such that it can pierce the covers 4 of all the expected types of capsules.

Naturally, the principle of the invention remaining the same, the forms of embodiment and the details of construction may be varied widely with respect to those described and illustrated, which have been given purely by way of non-limiting example, without thereby departing from the scope of the invention as defined by the attached claims.

The invention claimed is:

1. System for the preparation of beverages, comprising capsules (C) having a cup-shaped body (1) with a mouth opening (2) closed by a cover (4), a bottom wall (5) and an annular side wall (6) which extends between the mouth opening (2) and the bottom wall (5) tapering towards the bottom wall (5); said capsules (C) being of at least first and second types, having essentially equally-sized bottom walls (5) and different axial lengths (h1, h2, h3); and an infusion assembly (10) wherein there is defined a variable-volume infusion chamber (20), having an introduction opening (20a), an end delimitation part (16a) having shape and dimensions corresponding to those of the bottom wall (5) of said capsules (C), and with a lateral delimitation structure (13a, 13b; 14) which comprises a static portion (13a, 13b) and which extends between said introduction opening (20a) and the end delimitation part (16a);

the end delimitation part (16a) being movable inside the lateral delimitation structure (13a, 13b; 14) away from the introduction opening (20a);

the arrangement being such that one of said capsules (C), introduced into the infusion chamber (20), is capable of causing a movement of the end delimitation part (16a) away from the introduction opening (20a), such that the infusion chamber (20) assumes a configuration and dimensions corresponding to those of the type of capsule (C) introduced thereinto;

the system being characterized in that the lateral delimitation structure (13a, 13b; 14) of the infusion chamber (20) comprises further a movable portion (14) cooperating with said static portion (13a, 13b), said movable portion (14) being movable along a predetermined direction, transversely to the direction of introduction of the capsules (C) into said chamber (20), away from the fixed portion (13a, 13b), against the action of associated first opposing means (15), so as to increase the cross-section of the introduction opening (20a) and, correspondingly, the volume of the infusion chamber (20);

the end delimitation part (16, 16a) of the infusion chamber (20), being coupled to said movable portion (14), is movable against the action of associated second contrast means (19), such that a displacement of the end delimitation part (16, 16*a*) away from the introduction opening (20*a*) causes a corresponding movement of the movable portion (14) away from the fixed portion (13*a*, 13*b*) of the lateral delimitation structure (13*a*, 13*b*; 14).

2. System according to claim 1, wherein the capsules (C) of said types have a mouth opening (2) with an essentially rectangular shape, with a first pair of opposite sides (2*b*) which are identical in the different types of capsules, and a second pair of opposite sides (2*a*) having different lengths.

3. System according to claim 1, wherein the annular lateral wall (6) of the capsules (C) of said types includes at least one lateral wall (6*b*) inclined with respect to the axis (Z-Z) of the capsule (C), the inclination of said at least one lateral wall (6*b*) being essentially the same in the different types of capsules.

4. System according to claim 1, wherein the infusion assembly (10) comprises a piercing and injecting head (12) adapted to be coupled to a capsule-holding assembly (11) wherein said chamber (20) is defined, for piercing the cover (4) of a capsule (C) positioned in said chamber (20) and injecting a flow of fluid into said capsule (C) for producing the beverage; said piercing and injecting head comprising a plurality of piercing and injecting means (33; 33+43; 33+43+53), each designed for operation with a corresponding type of capsule (C); the capsules (C) of each type having respective selective activation means (3, 3*a*) capable, when said head (12) is coupled to the capsule-holding assembly (11), of selectively activating the corresponding piercing and injecting means (33; 33+43; 33+43+53).

5. System according to claim 4, wherein the piercing and injecting head (12) has a conduit (31) for supplying hot water and/or steam, selectively connectable, through a plurality of selectively activatable valve devices (33; 44; 54), to the piercing and injecting means (33; 33+43; 33+43+53) associated with each type of capsule; the capsules (C) of each type having respective formations (3; 3*a*) adapted to selectively activate the corresponding valve devices (33; 44; 54) of said head (12).

* * * * *